Jan. 11, 1966  K. B. JOHNSON  3,228,775
METHOD OF MAKING A PACKAGED PRODUCT CONTAINING
A SLEEVE OF SPONGE CAKE
Filed Aug. 31, 1962  2 Sheets-Sheet 1

INVENTOR
KENNETH BRASNET JOHNSON
BY

HIS ATTORNEYS

Jan. 11, 1966   K. B. JOHNSON   3,228,775
METHOD OF MAKING A PACKAGED PRODUCT CONTAINING
A SLEEVE OF SPONGE CAKE
Filed Aug. 31, 1962   2 Sheets-Sheet 2

INVENTOR
KENNETH BRASNET JOHNSON
BY
HIS ATTORNEYS

United States Patent Office 3,228,775
Patented Jan. 11, 1966

3,228,775
METHOD OF MAKING A PACKAGED PRODUCT CONTAINING A SLEEVE OF SPONGE CAKE
Kenneth Brasnett Johnson, Gerrards Cross, England, assignor to Lever Brothers Company, New York, N.Y., a corporation of Maine
Filed Aug. 31, 1962, Ser. No. 220,733
Claims priority, application Great Britain, Sept. 5, 1961, 31,927/61
7 Claims. (Cl. 99—171)

This invention relates to a method of making edible products, particularly confectionery products, and the products made thereby.

According to the present invention there is provided a method of making a packaged edible product incorporating a sleeve of sponge cake or similar edible material, the method including the steps of forming superimposed layers of sheet material and sponge cake or similar edible material into coaxial sleeves with the sheet material on the outside, and securing portions of the sheet material together to enable the sleeve of sheet material to retain the sponge cake or similar edible material in sleeve form, the sleeve of sheet material forming at least part of the packaging of the finished edible product.

The layers of sheet material and sponge cake or similar edible material can be formed by discrete pieces of these materials or by parts of continuous webs of these materials, these parts being severed from the continuous webs at some stage during the production of the product.

The edible product can be frozen whilst the sponge cake or similar edible material is retained in its sleeve form by the sheet material.

The sheet material can be cardboard or similar board material.

End caps can be placed over the ends of the edible product, these end caps together with the sleeve of sheet material forming a container for the edible product.

Said portions of the sheet material which are secured together can both belong to the same side of the sheet material and be such that the secured-together portions form a fin-like seam on the outside of the sleeve of sheet material.

The superimposed layers of sheet material and sponge cake or similar edible material can be shaped around a mandrel into their sleeves.

The sleeve of sponge cake or similar edible material can be filled with an edible substance in a flowable plastic state.

Edible substance can be deposited on the sponge cake or similar edible material before the sponge cake or similar edible material is formed into its sleeve form. The edible substance can be deposited in a frozen state and act as a mandrel around which the sponge cake or similar edible material can be shaped into its sleeve form.

Said edible substance can be ice cream, fresh cream or any other suitable filling for an edible product.

The invention will now be described with reference to the accompanying diagrammatic drawings, in which.

Figure 1:
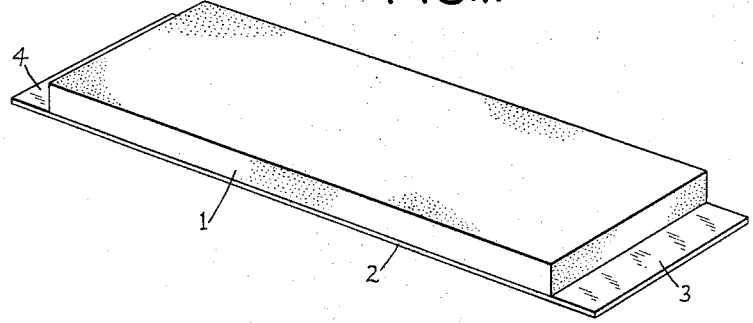
FIGURE 1 is a perspective view of a confectionery product during the first step in its production according to a first example of the invention.
Figure 2:
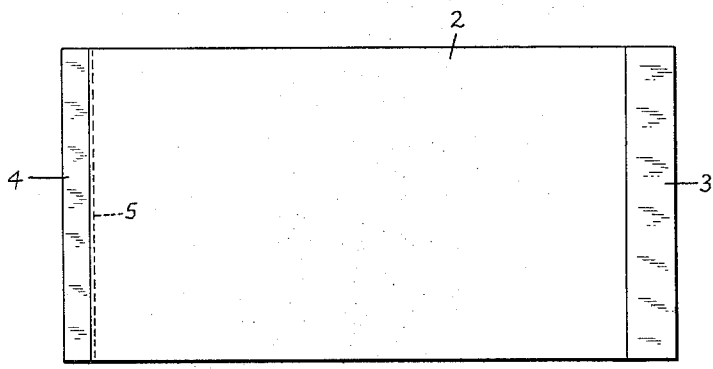
FIGURE 2 is a plan view of the sheet material shown in FIGURE 1.
Figure 3:
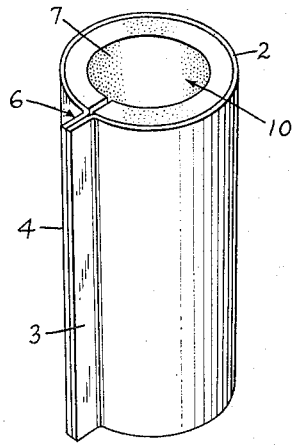
FIGURES 3, 4 and 5 show further steps in the process of the first example, FIGURES 3 and 5 being perspective views from different angles and FIGURE 4 being an end view.
Figure 5:
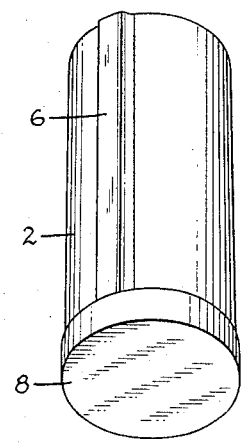
Figure 4:
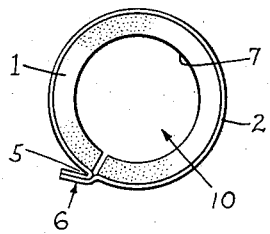

The first example illustrated in FIGURES 1 to 5 will be described first. A length of sponge cake sufficient for one product is cut from a continuous band of sponge cake which is made by continuously depositing a curtain of liquid sponge mix on a continuously moving endless belt which passes through an oven. The individual sponge cake 1 is placed centrally on a cardboard sheet 2 which has the same width as but is longer than the sponge cake so that one side of the sponge cake is completely covered by the sheet 2, as shown in FIGURE 1. The end portions 3, 4 of the sheet 2 extending beyond the sponge cake have been previously coated with a pressure sensitive adhesive and the end portion 4 has been delimited from the rest of the sheet by a line of perforations 5, as shown in FIGURE 2. The sponge cake and sheet are then shaped into coaxial cylindrical sleeves around a cylindrical mandrel (not shown) whose axis is vertical. This is achieved by drawing the two ends 3, 4 of the sheet 2 together around the mandrel, at the same time bending the ends 3, 4 outwards. These ends 3, 4 are then pressed together to seal them and so form a fin-like seam 6 down the outside of the cardboard sleeve 2, as shown in FIGURE 3. The mandrel is then withdrawn downwards and at the same time raspberry jam is extruded through an annular opening at the top of the mandrel to spread a thin layer 7 of jam over the inside surface of the sponge cake sleeve. The fin-like seam 6 is then bent about the line of perforations 5 to lie against the cardboard sleeve 2, as shown in FIGURE 4. A cardboard end cap 8 is slid over the lower end of the cardboard sleeve 2 to close this end and hold down the seam 6, as shown in FIGURE 5. The interior 10 of the cylindrical sleeve of sponge cake 1 is then completely filled with dairy ice cream in a soft state at 26° F., the ice cream being extruded through a nozzle. A second cardboard end cap is then slid on the other end to close it. The product is passed through a refrigerated blast tunnel and deep-frozen to 0° F. The end caps adhere to the ice cream during this freezing operation and this keeps them firmly in place. Thus, the cardboard sleeve together with the two end caps constitute a carton for the product which requires no further packaging. When a consumer wishes to remove the product from this carton it is only necessary to remove the end caps, tear the cardboard sleeve along the line of perforations 5, and press the cardboard 2 back from the product. The cardboard 2 is solid white foodboard which is waxed on both sides to prevent it sticking to the sponge cake and also to prevent it absorbing moisture from either the product or the atmosphere.

Figure 6:
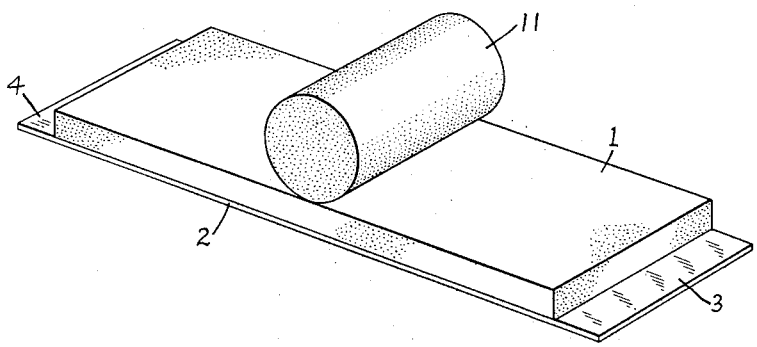
FIGURE 6 shows an intermediate step in the production of a confectionery product according to a second example of the invention.

The second example will now be described. A sponge cake is made as above and placed on a cardboard sheet as described with reference to FIGURES 1 and 2. A layer of jam may be spread over the upper surface of the sponge cake 1 before it is placed on the sheet 2. A cylinder 11 of ice cream in a hard state at −20° F. is then placed on the sponge cake 1, as shown in FIGURE 6. The gummed ends 3, 4 of the cardboard 2 are folded outwards and then drawn together to shape the sponge cake 1 around the cylinder 11 of hard ice cream which thus acts as a mandrel. The ends 3, 4 are then pressure sealed together to form a fin-like seam as described above with reference to FIGURE 3. This fin-like seam is then folded over as described with reference to FIGURE 4 and end caps slid over each end of the cardboard sleeve. The product is then placed in a refrigerated blast tunnel to deep-freeze the sponge cake.

In both the above examples the sponge cake and the cardboard are simultaneously formed into coaxial cylindrical sleeves and the outer cardboard sleeve retains the sponge cake in its sleeve form whilst further steps of the process are carried out. By using a suitable material for the outer retaining sleeve, a container for the product can be formed as the product is made and the necessity of subsequently packaging the finished product can be eliminated.

Alternatively, if desired, the retaining sleeve can be used as a wrapping for the product which can then be further packaged by placing the wrapped product in a carton; in this case the retaining sleeve could suitably be made of a thin transparent material, for example cellophane.

What is claimed is:

1. A method of making a packaged edible product including a sleeve of sponge cake, the method including the steps of superimposing a layer of sponge cake and a layer of wrapping material, bending the superimposed layers into coaxial sleeves with the wrapping material on the outside, securing portions of the wrapping material together to retain the sponge cake in sleeve form, the sleeve of wrapping material forming at least part of the wrapping of the finished edible product and providing a filling of edible material in said sponge cake sleeve.

2. A method of making a packaged edible product including a sleeve of sponge cake, the method including the steps of superimposing a layer of a sponge cake and a layer of cardboard, bending the superimposed layers into coaxial sleeves with the cardboard on the outside, gluing portions of the cardboard together to form a retaining sleeve around the sleeve of sponge cake, the cardboard sleeve forming at least part of the wrapping of the finished edible product and providing a filling of edible material in said sponge cake sleeve.

3. A method of making a packaged edible product including a sleeve of sponge cake, the method comprising the steps of superimposing a layer of sponge cake and a layer of packaging material, bending said layers into coaxial sleeves with the packaging material on the outside, securing portions of the packaging material together to retain the sponge cake in sleeve form, filling the sleeve of sponge cake with an edible substance in a flowable plastic state, and freezing the edible product while the sponge cake is retained in its sleeve form by the sleeve of packaging material.

4. A method as claimed in claim 3 in which said edible substance is ice cream.

5. A method of making a packaged edible product including a sleeve of sponge cake, the method comprising the steps of positioning a layer of sponge cake and a layer of sheet packaging material in face to face relation, depositing ice cream in cylindrical form on the layer of sponge cake, bending the layers of sheet material and sponge cake around the ice cream to form coaxial sleeves surrounding the ice cream with the sheet material on the outside, securing portions of the sheet material together to retain the sponge cake in sleeve form and form a partially wrapped product, and freezing said product whilst the sponge cake is retained in its sleeve form by the sleeve of sheet material.

6. A method of making a packaged edible product comprising positioning a layer of sponge cake and a layer of sheet packaging material in face to face relation, bending said layers into coaxial sleeves with the sheet material on the outside, securing together edge portions of the sheet material to retain the sponge cake in its cylindrical form, placing an end cap over one end of the sleeve of sheet material, filling the sleeve of sponge cake with ice cream, placing another end cap over the other end of the sleeve of sheet material to form a packaged product, and then freezing the packaged product.

7. A method as claimed in claim 6 in which the sheet packaging material is cardboard.

References Cited by the Examiner
UNITED STATES PATENTS

| 1,802,306 | 4/1931 | Baker | 99—137 |
| 1,873,716 | 8/1932 | Nickerson | 99—172 |
| 1,988,716 | 1/1935 | Traller | 99—172 |
| 2,062,249 | 11/1936 | Clearwater | 99—180 |
| 2,607,696 | 8/1952 | Kunz | 99—190 X |

A. LOUIS MONACELL, *Primary Examiner.*

BEATRICE H. STRIZAK, *Examiner.*